(12) United States Patent
Pergande et al.

(10) Patent No.: US 7,642,949 B2
(45) Date of Patent: Jan. 5, 2010

(54) ILLUMINATION SOURCE FOR MILLIMETER WAVE IMAGING

(75) Inventors: Albert N. Pergande, Orlando, FL (US); Lee A. Mirth, Orlando, FL (US); Lawrence T. Anderson, Windermere, FL (US); Michael A. Tomcsak, Orlando, FL (US); William S. McKinley, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 254 days.

(21) Appl. No.: 11/498,182

(22) Filed: Aug. 3, 2006

(65) Prior Publication Data

US 2009/0289830 A1 Nov. 26, 2009

(51) Int. Cl.
*G01S 13/00* (2006.01)

(52) U.S. Cl. .............................. 342/27; 342/22; 342/59; 342/176; 342/179

(58) Field of Classification Search ..................... 342/22
See application file for complete search history.

(56) References Cited

U.S. PATENT DOCUMENTS

| | | | | |
|---|---|---|---|---|
| 5,227,800 | A * | 7/1993 | Huguenin et al. | 342/179 |
| 6,046,799 | A * | 4/2000 | Lysen | 356/139.1 |
| 6,147,706 | A * | 11/2000 | Inuiya et al. | 348/226.1 |
| 2002/0006226 | A1* | 1/2002 | Shiota | 382/203 |
| 2003/0035576 | A1* | 2/2003 | Roder | 382/147 |
| 2004/0211888 | A1* | 10/2004 | Shur et al. | 250/221 |
| 2005/0017829 | A1* | 1/2005 | Higgins | 333/262 |
| 2005/0073411 | A1* | 4/2005 | Butler | 340/552 |
| 2006/0022128 | A1* | 2/2006 | Vaidya | 250/252.1 |

FOREIGN PATENT DOCUMENTS

| | | |
|---|---|---|
| WO | WO 01/33258 A1 | 5/2001 |
| WO | WO 03/083508 A1 | 10/2003 |

OTHER PUBLICATIONS

New Applications of Millimeter-Wave Incoherent Imaging, Microwave Symposium Digest, 2005 IEEE.
Passive and Active Imaging of humans for Contraband Detection at 640 GHz, Microwave Symposium Digest, 2004 IEEE.

* cited by examiner

*Primary Examiner*—Thomas H Tarcza
*Assistant Examiner*—Timothy A Brainard
(74) *Attorney, Agent, or Firm*—Birch, Stewart, Kolasch & Birch, LLP

(57) ABSTRACT

Methods and apparatuses of scene illumination for millimeter wave sensing are presented. One embodiment features illuminating a subject with millimeter wave radiation produced by at least one fluorescent light, generating an image with a passive sensor using the millimeter wave radiation reflected from the subject, and analyzing the image to detect representations corresponding to concealed objects associated with the subject. Another embodiment features at least one fluorescent light which illuminates a subject with millimeter wave radiation, and passive millimeter wave sensor which receives the millimeter wave radiation effected from the subject, and generates an image which is analyzed to detect image representations corresponding to concealed objects. Another embodiment features at least one florescent light behind an optically opaque medium which is transparent to millimeter wave radiation, and illuminating a subject with millimeter wave radiation produced by the fluorescent light.

32 Claims, 4 Drawing Sheets

ILLUMINATION SOURCE FOR MILLIMETER WAVE IMAGING

BACKGROUND OF THE INVENTION

Embodiments of the present invention generally relate to millimeter wave (MMW) imaging, and more specifically, illuminating a scene with diffuse radiation to improve the contrast produced by a passive MMW imaging sensor.

Electromagnetic energy in the millimeter wave region possess wavelengths which advantageously can be used to form images using relatively small imaging sensors, while being able to penetrate classes of materials which can commonly be used to conceal or camouflage weapons, containers, various other forms of contraband. In other applications, MMW imaging sensors may be used to detect people and/or animals by penetrating through walls. MMW imaging can offer real-time remote detection of hazards of metallic and/or non-metallic materials which can be concealed in a variety of ways, including being cloaked by one or more layers of clothing.

Either passive or active MMW imaging sensors may be used for concealed contraband detection; however, passive sensors can have the advantage of simplicity, reduced size, and reduced power consumption. Additionally, because passive MMW imaging sensors do not directly provide electromagnetic radiation for scene illumination, the passive sensors are not associated with detrimental physical side effects, or any perceived notions thereof, associated with the irradiation of subjects under surveillance.

Both passive and active MMW imaging sensors typically rely on contrast to generate useful images. The environmental conditions under which a passive MMW image created can be is one of the principal contributors in providing sufficient contrast. When imaging subjects outdoors, the clear sky can provide an excellent background for MMW imaging because it appears "cold" in the MMW wavelengths, that is, the sky provides little energy in the MMW region and therefore registers with a low temperature. The cold clear sky background can be exploited for detecting concealed objects.

An example of concealed object detection occurring outdoors on a clear day is as follows. A metal object such as a gun may be visibly concealed on a person under clothing, however, the surface of the gun which is not in contact with the person will "reflect" MMW energy corresponding to the cold sky, because clothing can be transparent to MMW waves. Moreover, the person will tend to have higher than ambient MMW temperature (as will be for fully described below), which can also be readily apparent to a MMW sensor given the transparency of the person's clothes. The difference in temperature between the person and the concealed gun provides sufficient contrast so the gun can be detected underneath the person's clothing.

However, when the above passive MMW imaging scenario occurs indoors, or in some other reduced contrast scenario such as outdoors on a rainy day there may not be sufficient contrast to reliably detect the concealed gun. While energy associated with MMW wavelengths can pass through walls depending upon the material from which they are made and wall's thickness, MMW contrast can be greatly attenuated indoors. Accordingly, the cold sky may not be available to provide sufficient contrast to detect the concealed gun or any other object behind the person's clothes. Like other forms of electromagnetic waves, MMW radiation can be polarized. MMW radiation sources and sensors can be configured to utilize polarization to distinguish between various types of materials. For example, objects made from metals will reflect polarized MMW radiation differently than objects made from plastics. These variations in reflected energy can be exploited with subsequent image processing techniques to provide additional information to aid in the classification of concealed objects.

In the past, various approaches have been tried to improve the ability of passive MMW sensors to make useful images in low contrast scenarios, but have been met with limited success. These approaches include providing MMW illumination sources such as oscillators, noise sources, and point sources, sometimes coupled with diffusers, all operating in the MMW region. These techniques can be problematic because they tend to saturate the MMW sensor, as it may have limited dynamic range. Moreover, images generated utilizing these MMW sources can suffer from glint and scintillation effects which can reduce the ability to exploit the MMW image to detect concealed objects. Other techniques have included providing a controlled environment, such as thermally controlled panels (e.g., a wall chilled using circulated water) to act as a cool radiometric background for improving contrast. Moreover, these approaches can increase complexity and cost as they may involve careful geometric control, precise signal timing, and/or critical alignment of scene being imaged.

What is therefore needed is a common, unobtrusive source that can provide diffuse MMW illumination in a simple and cost effective manner.

SUMMARY OF THE INVENTION

Accordingly, embodiments of the present invention are directed to providing illumination for passive MMW imaging sensors which may substantially overcome and/or obviate challenges associated with conventional techniques.

One embodiment directed to detecting concealed objects is presented. The embodiment features illuminating a subject with millimeter wave radiation produced by at least one fluorescent light, generating an image with a passive sensor using the millimeter wave radiation reflected from the subject, and analyzing the image to detect representations corresponding to concealed objects associated with the subject.

Another embodiment is directed to a device for detecting concealed objects. This embodiment features at least one fluorescent light which illuminates a subject with millimeter wave radiation, and a passive millimeter wave sensor which receives the millimeter wave radiation effected from the subject, and generates an image which is analyzed to detect image representations corresponding to concealed objects.

Yet another embodiment is directed to a method for generating images using millimeter wave energy. This embodiment features placing at least one radiation source in proximity to a scene, energizing the radiation source so that it fluoresces in the millimeter wave frequency region, illuminating the scene with the fluoresced millimeter wave radiation, and receiving the millimeter wave radiation reflected from the scene.

Another embodiment is directed to a method for providing illumination to detect concealed objects. This method features placing at least one florescent light behind an optically opaque medium which is transparent to millimeter wave radiation, and illuminating a subject with millimeter wave radiation produced by the fluorescent light.

Additional features of embodiments of the invention will be set forth in the description which follows, and in part will be apparent from the description, or can be learned by practice of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

The following detailed description of the embodiments of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
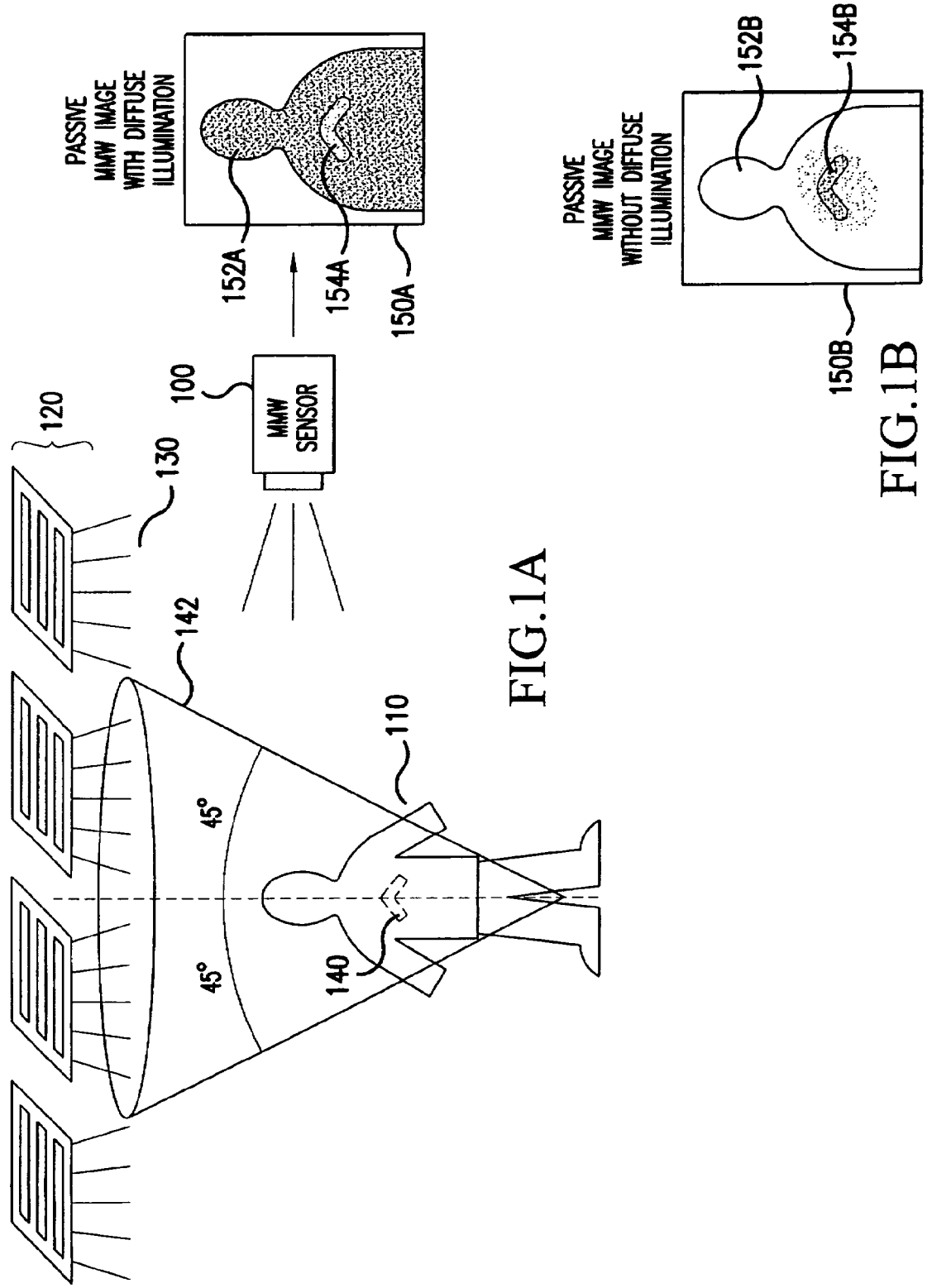
FIG. 1A depicts an exemplary MMW illumination arrangement and sensor consistent with an embodiment of the invention.
FIG. 1B depicts an exemplary image for the embodiment shown in FIG. 1 when the illumination source is off.

FIG. 1A depicts a passive MMW sensor utilizing diffuse illumination consistent with an embodiment of the invention. One or more fluorescent lights 120 can placed in proximity to a subject 110 within a scene being surveilled. Fluorescent lights 120 irradiate scene and subject 110 therein with MMW energy. Subject 110 can be carrying a concealed object 140 hidden by one or more layers of clothing. The surveillance can be performed by a MMW sensor 100, which produces an image based upon MMW radiation 130 reflected from the scene, which can be provided by fluorescent lights 120.

Typically, MMW sensor 100 can be a passive sensor, meaning the sensor itself does not supply any MMW energy to illuminate the scene being imaged. However, the invention does not preclude other types of MMW sensors being used, and embodiments could be directed to a MMW sensor which can have the capability of providing MMW energy to illuminate the subject.

As used herein, frequencies in the MMW region can span between several Mega-Hertz up to Tera-Hertz. MMW sensor 100 can operate at center frequencies of approximately 94 GHz with a bandwidth of approximately 1 to 10 GHz. Any type of passive MMW sensor known in the art may be used, such as, for example, MMW sensors produced by Brijot Imaging Systems.

MMW sensor 100 may be used to detect any type of concealed object under the proper contrast conditions. Concealed objects which can be detected can be made from, in part or in whole, materials which include metals, both ferrous and non-ferrous, and dielectric materials, such as, for example, plastics, polycarbonates such as Lexan, etc. MMW sensor 100 can detect obvious contraband such as, for example, weapons, plastic explosives, knives, containers with drugs, etc. MMW sensor can also detect concealed objects such as cell phones and other portable electronic devices such as, for example, personal digital assistants, cameras, digital storage devices, and/or audio recorders. Such capability can be especially useful in applications including portal protection, TSA airport screening, urban gang control, schools, prison safety, and border control.

Image 150A provided by MMW sensor can include an array of pixels representative of the subject being imaged. Each pixel value represents a magnitude corresponding to the amount of MMW energy in a small area represented by each pixel. Differences in pixel magnitudes in the image can be proportional to contrast. It is the contrast which allows one to interpret the image and derive information from it, and can therefore be desirable to produce images having high contrast. Image 150A was produced using the MMW radiation 130 from fluorescent lights 120 to illuminate subject 110. Pixels representing subject 110, shown as subject representation 152A, can be darker because subject 110 is primarily emissive, and does not reflect MMW radiation 130 provided by fluorescent lights 120. Concealed object 140, which, for example, could be a gun made from metal, can be primarily reflective, and the pixels corresponding to object representation 154A have higher values and appear brighter in the image against the relatively darker background of subject representation 152A. The diffuse illumination of subject 110 by MMW radiation 140 permits the high contrast between subject representation 152A and object representation 154A. While image 150A shows pixels having a larger magnitude as lighter in color, and pixels having lower magnitudes as darker, one of ordinary skill in the art would appreciate that this mapping could be inverted. Moreover, image 150A can be digitally analyzed and/or enhanced to improve detection and/or identification of concealed object 154A by techniques known to one of ordinary skill in the art.

FIG. 1B depicts an image 150B representative of subject 110 produced without the diffuse illumination provided by MMW radiation 130, which corresponds to fluorescent lights 120 being turned off. Subject 110 is emissive, and naturally provides MMW energy, so pixels corresponding to subject representation 152B have higher relative magnitudes that the pixels corresponding to object representation 154B. In this case, concealed object 140 can reflect the colder temperature corresponding to the surrounding environment. Because subject 110 is being imaged indoors, concealed object 140 is not as cold as it would be if the subject were being imaged outdoors, and as a result object representation 154B is not very dark. Because the relative MMW radiometrc temperature difference between subject 110 and concealed object 140 are not as great as shown in image 150A, the relative contrast between subject representation 152B and object representation 154B is reduced. The reduction in constant depicted in image 150B can be less effective for detecting concealed objects and can therefore be less desirable.

Further referring to FIG. 1A, fluorescent lights 120 can be ordinary fluorescent light tubes commonly found in homes and office buildings. In addition to providing visible light, ordinary fluorescent light tubes can emit enough MMW energy so the scene appears illuminated with 40 to 60 degrees Celsius above typical ambient conditions. In the process of producing visible light, the fluorescent tubes also fluoresce MMW radiation, including frequencies from 35 to 94 GHz. Ordinary fluorescent tubes can provide broad and diffuse illumination with sufficient MMW radiation to provide images with sufficient contrast for performing concealed object detection. To further diffuse the MMW illumination, diffusers which scatter MMW energy could be placed in front of fluorescent lights 120. Material which could be used for MMW diffusion could be plastic such as, for example, Rexolite, Lexan™, polycarbonate or any other material known in the art. Ordinary fluorescent tubes are commonly used and therefore typically have the advantage of being inexpensive and easy to obtain. Moreover, such tubes are well established, and thus do not present any safety issues or other regulatory concerns which may be present when using other radiation sources. Because ordinary fluorescent tubes have been in long use in both commercial and domestic settings, they are not associated with any perceived health risks and therefore are socially acceptable in the eyes of the public.

Other embodiments of the invention may utilize radiation sources which can be specifically designed and optimized to fluoresce in the MMW frequency regions. For example, fluorescent tubes may manufactured without an interior phosphor coating to limit fluorescence to energy in the visible wavelengths, which may improve efficiency in the MMW frequencies, improve the ability to conceal the radiation sources, and reduce the cost of manufacturing fluorescent MMW radiation sources.

Placement of fluorescent lights 120 can be arranged to provide uniform and diffuse illumination of MMW radiation. Uniform MMW illumination may be accomplished using an arrangement consistent with standards commonly associated with office lighting designed to provide uniform optical illumination. The spacing of fluorescent lights 120 can be a function of the distance from subject 110 and the intensity of the MMW illumination desired. As shown in FIG. 1A, fluorescent lights 120 may be visibly exposed and placed above the subject to be surveilled. One design approach for improving MMW illumination uniformity would be to place lights above a subject and within a boundary formed by a cone of revolution 142, defined by a 45 degree angle from a vertical reference line, relative to the subject. Other embodiments of the invention having alternative fluorescent light placement are described in more detail below.

Figure 2:
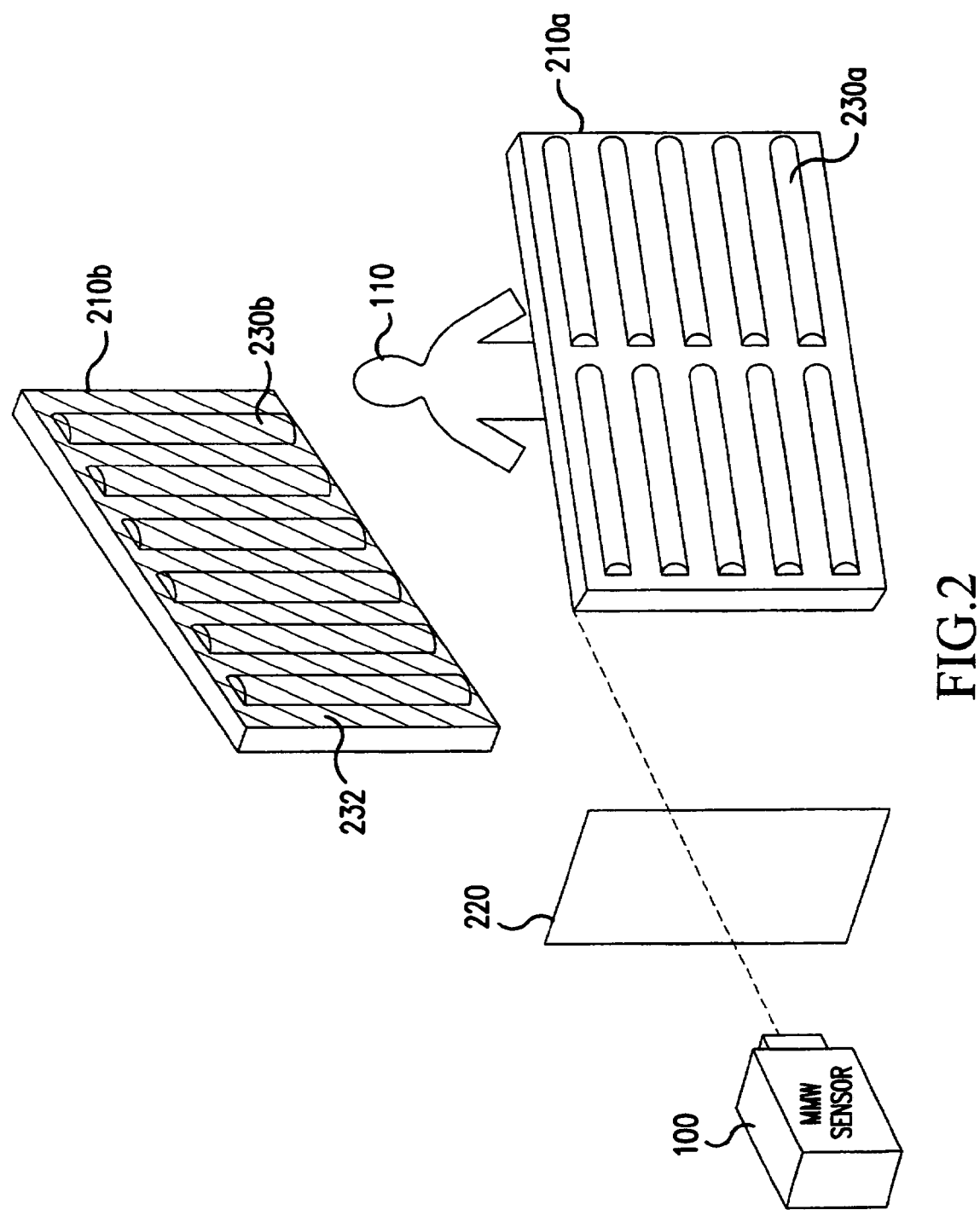
FIG. 2 shows an exemplary system having a lateral illumination arrangement consistent with another embodiment of the invention.

FIG. 2 depicts another fluorescent light bulb placement consistent with another embodiment of the invention. In this embodiment, subject 110 can be observed surreptitiously, as MMW sensor 100 and fluorescent lights 203a and 230b can be placed behind a screen 220 made from an optically opaque material transparent to MMW energy. MMW sensor 100 can be placed to produce an image most likely to accurately detect concealed objects. In practical systems, MMW sensor 100 can be placed, for example, between 5 and 30 feet from subject 110. Fluorescent lights 230b can be placed alongside subject 110 inside structure 210b. Structure 210b can cover fluorescent lights 230b with screen 232 which is optically opaque and MMW energy transparent, so fluorescent lights 230b cannot be seen by subject 110. Screen 232 may be made from material similar to screen 220. An additional structure 210a housing fluorescent lights 230a can also be placed along an opposite side of subject 110 to provide additional MMW radiation. Additionally, fluorescent light tubes 230a and 230b may be aligned differently to illuminate subject 110 with MMW radiation having different polarizations. For example, fluorescent light tubes 230b may be placed substantially in vertical alignment with subject 110; and fluorescent light tubes 230a may be placed substantially horizontally with respect to subject 110. Embodiments of the invention which exploit the polarization properties of the MMW radiation are presented in more detail below.

Other embodiments of the invention could include placing fluorescent lights in portals, under floors, behind sheet rock covering walls, or in any place which may be optically opaque but transparent to MMW radiation.

It has been observed that the MMW radiation produced by fluorescent lights can be modulated based upon the modulation of the energizing voltage. For example, modulation of MMW radiation produced by fluorescent lights can be substantially sinusoidal having a frequency of 60 Hz. This modulation can be used to alter the MMW illumination of subject 110 to produce images having differing characteristics, which can be analyzed and combined to improve the detection of concealed objects. One of ordinary skill in the art would appreciate that frequencies other than 60 Hz, and modulations other than sinusoidal, may be used with other embodiments of the invention. If the modulation frequency chosen is low enough to cause perceptible flickering, the fluorescent lights can be placed behind a screen to mitigate the flickering.

Figure 3:
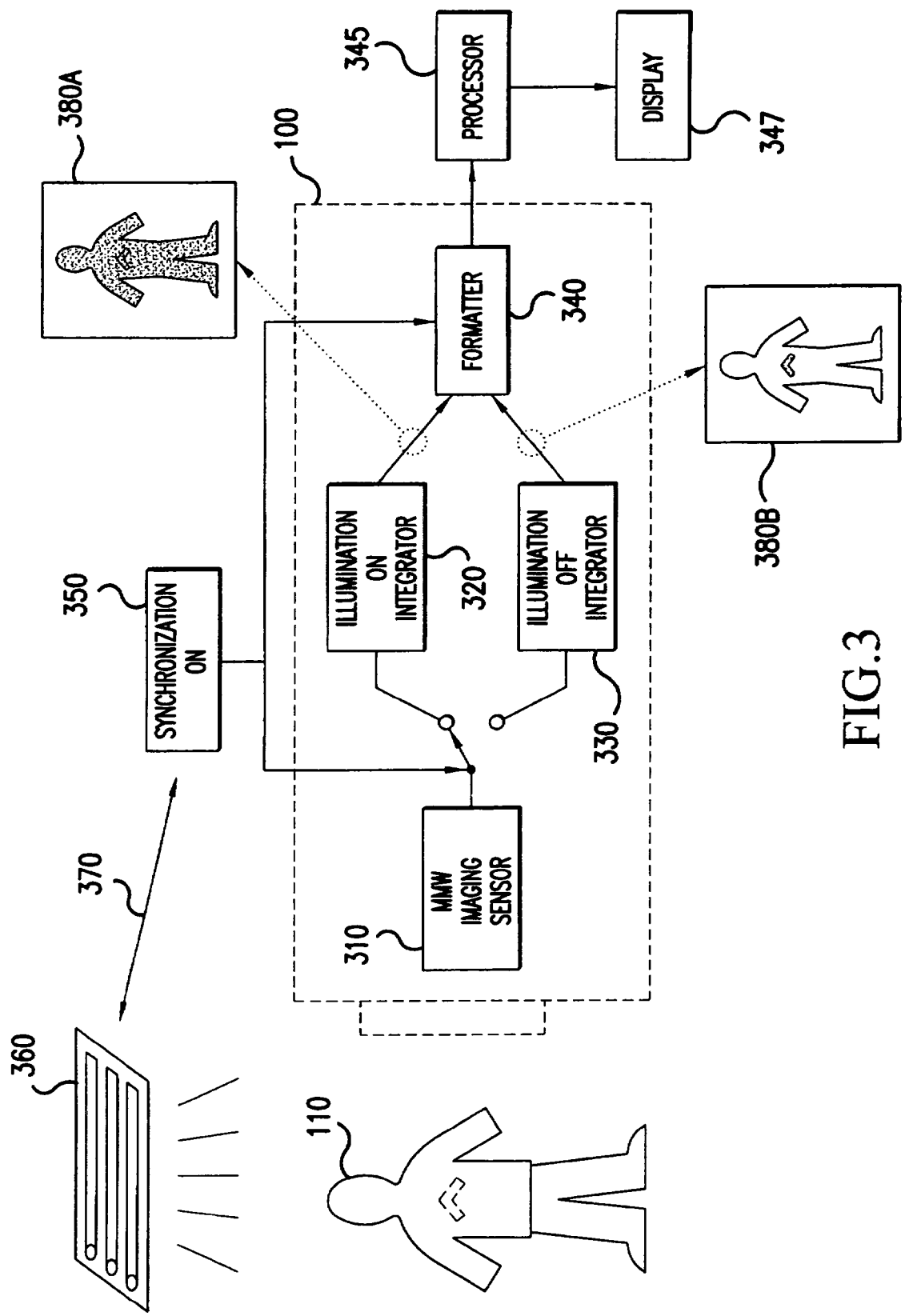
FIG. 3 depicts a sensor utilizing modulated MMW radiation consistent with another embodiment of the invention.

FIG. 3 depicts a sensor utilizing modulated MMW radiation consistent with another embodiment of the invention. This embodiment exploits the sinusoidal modulation of fluorescent lights 360 associated with the 60 Hz line voltage to form an image of subject 110 when fluorescent lights 360 are in an "on" state, and form an image when fluorescent lights 360 are in an "off" state. The two images may be processed to yield better concealed object detection results.

Fluorescent lights 360 can be positioned overhead as shown, or placed in some alternative manner proximate to subject 110 to provide diffuse modulated MMW radiation for illumination. Synchronization unit 350 can determine the modulation of fluorescent lights 360 through coupling 370, and then provide signals to MMW sensor 100 to synchronize components thereof for proper operation with modulated fluorescent lights 360.

MMW sensor 100 further includes MMW imaging sensor 310, which collects an image of the subject 110. MMW sensor provides images to an ON integrator 320 and an OFF integrator 330. The images are directed to each integrator through a switch which can be controlled by synchronization unit 350. Each integrator 320 and 330 sums data received by MMW imaging sensor 310 over a period of time, such as, for example, 700 microsecond to 10 milliseconds, which can improve the image's signal to noise ratio.

An "on" image 380A can show reflective objects as being bright, as it reflects the MMW radiation provided by fluorescent lights 360, and the subject as being dark. An "off" image 380B can show the reflective object as being dark, as it is reflecting cooler radiometric temperatures associated with the environment, and the representation of the subject as being brighter due to the subject's emissive nature.

The "on" image and the "off" image are passed from each respective integrator into a formatter 340. Formatter 340 can provide additional header data, such as whether the image is an "on" image or an "off" image, and can further transform the data into a format suitable for processing. A processor 345 receives the images from formatter 340 and can perform operations to analyze and/or combine the images to improve the probability of detecting a concealed target. After the images have been processed, each image, or a combined image, can be shown on a display 347.

Processor 345 can perform, for example, difference processing between the two images which can identify the type of material from which the concealed object is made. Any other processing known to one of ordinary skill in the art may be performed on the two images, either separately or in combination with each other.

Synchronization unit 350 can operate by monitoring the power line supply fluorescent lights 360 if detector and lights are on same voltage phase. In this case, coupling 370 can be performed using common power lines. Alternatively, a light sensing device, such as, for example, a photodiode, can be the coupling 370, which can provide a signal which synchronization unit 350 may used to synchronize MMW sensor 100 with fluorescent lights 360.

It also has been observed that the MMW radiation produced by fluorescent lights tubes has energy which can be highly polarized down length of tube. When plastic objects are illuminated with polarized MMW energy, the reflections received can vary depending on the orientation of the plastic object. This phenomena can be attributed to the interaction of the MMW electric fields and the dielectric properties of the plastic. However, reflections received from metal objects typically do not vary with orientation. By using polarized MMW radiation sources and sensors, the differing phenomenology between metal and plastic materials can be used to identify and differentiate concealed objects made from metal and plastic.

Figure 4:
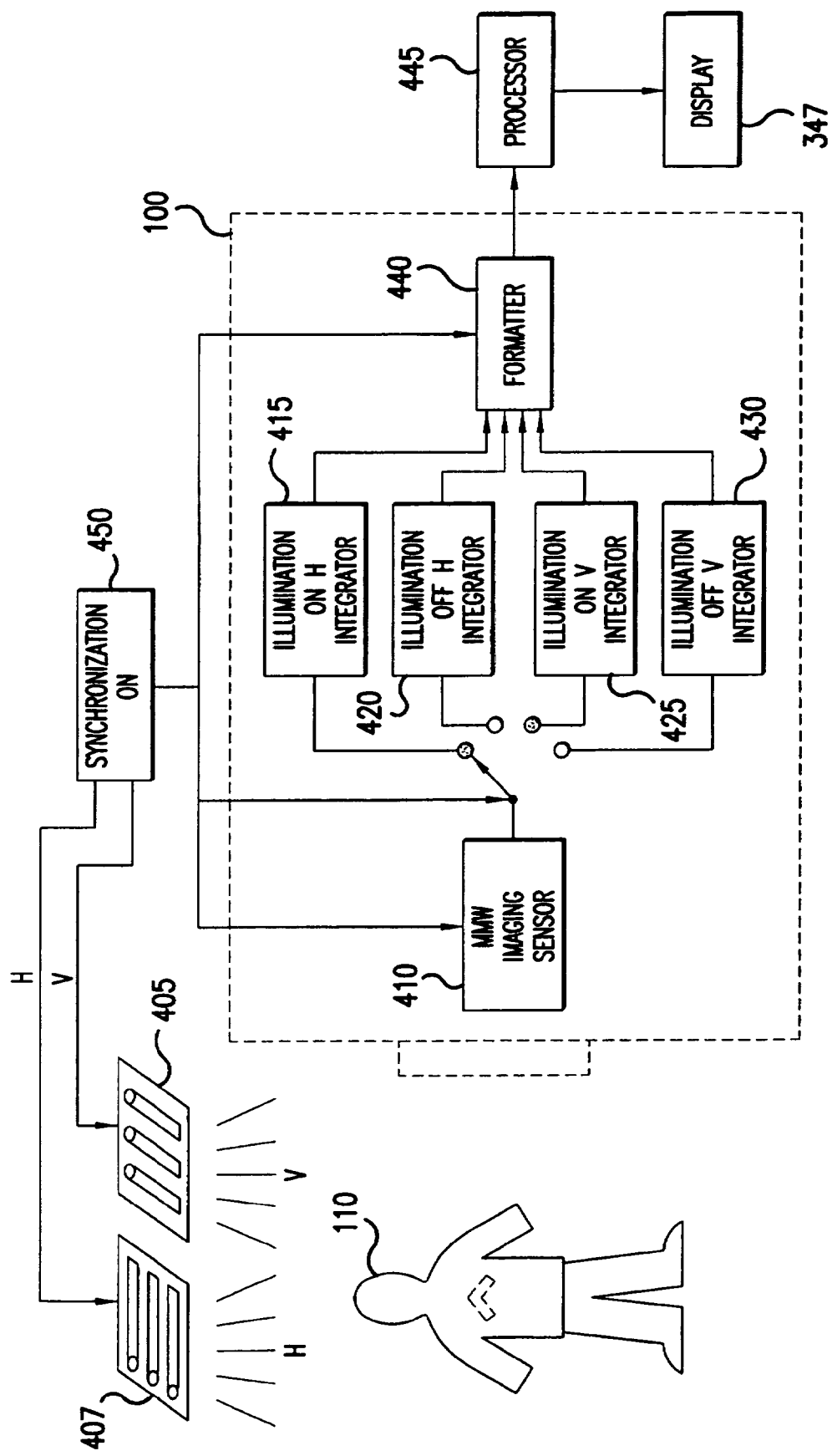
FIG. 4 depicts a sensor utilizing MMW radiation having polarimetric properties consistent with another embodiment of the invention.

FIG. 4 depicts a sensor utilizing MMW radiation having polarimetric properties consistent with another embodiment of the invention. At least one pair of light tubes 405, 407 can be positioned in proximity to subject 110. Fluorescent light tubes 405 and 407 can be set up perpendicular to each so, for example, fluorescent light tubes 405 provide vertical polarization, while fluorescent light tubes 407 provide horizontal polarization. The horizontal and vertical orientations of fluorescent light tubes 405, 407 would be set up relative to MMW sensor 100. As stated before, the fluorescent light tubes may be set above the subject 110 as shown in FIG. 4, or can be set in other proximate positions. Additionally, the fluorescent light tubes 405, 407 may be positions so that one set is positions vertically to subject 110, and one set is positioned horizontally to subject 110.

In order to separately form images for each polarization, fluorescent light tubes 405, 407 can be separately controlled to interleave the illumination corresponding to the H and V polarizations. This could be accomplished by providing separate control signals to fluorescent light tubes 405, 407. In a similar manner as described above in the previous embodiment, fluorescent light tubes 405, 407 can be modulated to take advantage of the dual polarization and create MMW images in both the "on" and "off" fluorescent light tube state for each polarization. For example, modulation of MMW radiation produced by fluorescent lights 405, 407 can be substantially sinusoidal having a frequency of associated with the power line frequency, e.g. 60 Hz. While the control signals could have the same frequency, they should be 90 degrees out of phase with each other to alternate the polarizations. The control signal could be voltage providing the power to illuminate the fluorescent light tubes. One of ordinary skill in the art would appreciate that frequencies other than 60 Hz, and modulations other than sinusoidal, may be used with other embodiments of the invention.

This modulation can be used to alter the MMW illumination of subject 110 for both horizontal and vertical polarizations to produce four images, each having differing characteristics. These images can be subsequently analyzed and combined to improve the detection of concealed objects.

Synchronization unit 450 can orchestrate the modulation of fluorescent lights 405, 407 by providing separate H and V control signals. As mentioned above, the signals could be sinusoidal or take on any other form known to one of ordinary skill in the art. Alternatively, synchronization unit 450 could utilize two photo diodes, one sensitive to H polarization, and the other sensitive to V polarization, to monitor which set of fluorescent light tubes 405, 407 is irradiating subject 110, and provide this information to the components of MMW sensor 100 for synchronization.

MMW sensor 100 further includes a polarization sensitive MMW imaging sensor 410, which collects an image of subject 110 for both H and V polarizations. MMW sensor can receive a polarization command from synchronization unit 450 to command what polarization the MMW sensor is to receive. Based upon the polarization command and a signal indicating whether the fluorescent light tubes where "on" or "off", the image is sent to the appropriate integrator via a switch which can be controlled by synchronization unit 450. The embodiment can include four separate integrators: an ON integrator for H polarization 415, an OFF integrator for H polarization 420, an ON integrator for V polarization 425, and an OFF integrator for V polarization 430. Each integrator 415-430 sums data received by MMW imaging sensor 410 over a period of time, such as, for example, 700 micro-second to 10 milli-seconds, which can improve the image's signal to noise ratio.

Both H and V polarization's "on" and "off" images are passed from each respective integrator into a formatter 440. Formatter 440 can provide additional header data, such as whether the image is an "on" image or an "off" image, the image's H or V polarization designation, and can further transform the data into a format suitable for processing. A processor 445 receives the images from formatter 440 and can perform operations to analyze and/or combine the images to improve the probability of detecting a concealed target. After the images have been processed, each image, or a combined image, can be shown on a display 347.

Processor 445 can perform, various processing between the four (Hon, Hoff, Von, Voff) images which can identify the type of material from which the concealed object is made. For example, sums and differences between the H and V polarizations can be performed to produce an image which is analogous to a Stokes vector. Any other forms of image and/or signal processing may be performed on the four images, either separately or in other combinations, which are known to one of ordinary skill in the art.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of generating images using millimeter wave energy, the method comprising:
   illuminating a subject with millimeter wave radiation produced by at least two millimeter wave radiation sources, wherein said illuminating comprises:
   polarizing a first millimeter wave source with a first polarization;
   polarizing a second millimeter wave source with a second polarization; and
   modulating the first and second radiation source to produce modulated millimeter wave radiation, wherein modulating comprises first modulating the first millimeter wave source with a first modulation that alternates the states of the radiation source between a first state and a second state and second modulating the second millimeter wave source with a second modulation that alternates the states of the radiation source between said first and second states;
   generating a first image of the subject using the millimeter wave radiation detected by a millimeter wave sensor when the first radiation source is in the first state;
   generating a second image of the subject with the millimeter wave radiation detected by the millimeter wave sensor when the second radiation source is in the first state;
   analyzing the generated images to detect representations corresponding to objects associated with the subject, wherein the analyzing comprises identifying an object in the generated images based on properties of an object identified in the first image properties of the same object in the second image with respect to millimeter wave radiation.

2. The method according to claim 1, further comprising synchronizing the millimeter wave sensor to the modulating.

3. The method according to claim 1, wherein said first state of the at least one millimeter wave radiation source is "on" and wherein said second state of the at least one millimeter wave radiation source is "off."

4. The method according to claim 1, wherein analyzing the generated images further comprises differentiating between objects made from at least one of metal and plastic or dielectric materials.

5. The method according to claim 1, illuminating comprises placing at least one of said radiation sources above the subject in a manner which provides substantially uniform optical illumination.

6. The method according to claim 1, wherein illuminating comprises placing at least one of said radiation sources substantially laterally with respect to the subject.

7. The method according to claim 1, further comprising concealing at least one of said radiation sources by an optically opaque medium which is transparent to millimeter waves.

8. The method according to claim 1, further comprising concealing said sensor by an optically opaque medium which is transparent to millimeter waves.

9. The method of claim 1, wherein analyzing further comprises combining the generated images into at least one composite image such that the at least one composite image has better image quality than any individual generated image.

10. An apparatus for detecting concealed objects, comprising
at least a first modulated millimeter wave radiation source which illuminates a subject with millimeter wave radiation having a first polarization, wherein said modulated millimeter wave radiation source modulates between at least a first illumination state and a second illumination state;
at least one second millimeter wave source which illuminates a subject with millimeter radiation having a second polarization and a second modulation that alternates the second wave source between a third state and a fourth state
a millimeter wave sensor which receives millimeter wave radiation from the subject; and
a synchronization unit that produces a synchronization signal, wherein the synchronization signal contains information regarding the modulation of the radiation sources,
wherein the millimeter wave sensor comprises:
a millimeter wave imaging sensor;
a switch operatively coupling the synchronization unit to each of at least two integrators, wherein the switch is controlled by the synchronization unit such that the synchronization signal operates the switch, and further wherein
the first integrator is activated by the switch to generate first image data from millimeter wave radiation detected by said imaging sensor when the first radiation source is in the first illumination state; and
the second integrator is activated by the switch to generate second image data from millimeter wave radiation detected by said imaging sensor when the second radiation source is in the third illumination state, wherein the first integrator is de-activated when the second integrator is activated, and vice-versa.

11. The apparatus according to claim 10, wherein the millimeter wave sensor further comprises:
a formatter operatively coupled to the plurality of integrators, wherein the switch, the formatter and at least one radiation source are synchronized by a synchronization signal.

12. The apparatus according to claim 10, wherein the synchronization signal is 60 Hz electric power signal.

13. The apparatus according to claim 10, wherein the first radiation source includes at least one first fluorescent light and the second radiation source includes at least one second fluorescent light such that the first light is placed at right angles to the second light to provide illuminations having different polarizations.

14. The apparatus according to claim 13, further comprising an illumination modulator that switches between the at least one first fluorescent light and the at least one second fluorescent light to provide illumination which alternates between the first polarization and the second polarization.

15. The apparatus according to claim 10, wherein at least one radiation source is concealed by an optically opaque medium which is transparent to millimeter waves.

16. The apparatus according to claim 10, wherein the millimeter wave sensor concealed by an optically opaque medium.

17. The apparatus according to claim 10, wherein the synchronization unit comprises an electro-optical sensor operatively connected to the millimeter wave sensor, where the electro-optical sensor detects the modulation frequency of at least one radiation source and matches the synchronization signal to the detected modulation frequency.

18. An apparatus for detecting concealed objects, comprising
at least one first millimeter wave source which illuminates a subject with millimeter wave radiation having a first polarization and a first modulation that alternates the first wave source between a first state and a second state;
at least one second millimeter wave source which illuminates a subject with millimeter radiation having a second polarization and a second modulation that alternates the second wave source between a third state and a fourth state,
a millimeter wave sensor which receives the millimeter wave radiation reflected from the subject, and generates an image which is analyzed to detect image representations corresponding to concealed objects; and
a synchronization unit operatively coupled at least one of the millimeter wave sources, wherein the millimeter wave sensor includes:
a millimeter wave imaging sensor;
a plurality of integrators;
a formatter operatively coupled to the plurality of integrators and synchronization unit;
a switch operatively coupling the imaging sensor to each of the plurality of integrators, wherein the switch is controlled by the synchronization unit and wherein the plurality of integrators includes:
a first integrator receiving from the switch a first image corresponding to when the at least one first source is in the first state;
a second integrator receiving from the switch a second image corresponding to when the at least one first source is in the second state;

a third integrator receiving from the switch a third image corresponding to when the at least one second source is in the third state, a fourth integrator receiving from the switch a fourth image corresponding to when the at least one second source is in the fourth state, and wherein the synchronization unit is configured to provide a first synchronization signal to the at least one first source, and a second synchronization signal to the at least one second source, and further wherein the first and second synchronization signals operate the switch, and further wherein the formatter receives all four images and configures the images using the synchronization signals.

19. The apparatus according to claim 18, wherein the first, second, third, and fourth images are analyzed by comparison to each other.

20. The apparatus according to claim 18, wherein the concealed objects include objects made from at least one of metal and plastic materials.

21. The apparatus according to claim 18, wherein the first radiation source comprises at least one fluorescent light that is placed above the subject in a manner which provides substantially uniform optical illumination.

22. The apparatus according to claim 18, wherein the first radiation source comprises at least one fluorescent light that is placed substantially laterally with respect to the subject.

23. The apparatus according to claim 13, wherein the at least one first fluorescent light is placed substantially laterally with respect to the subject.

24. The apparatus of claim 18, wherein the synchronization unit comprises an electro-optical detector operatively coupled to the sensor, wherein the detector detects a modulation frequency of one of the modulated millimeter wave sources and matches the synchronization signal to the detected modulation frequency.

25. The apparatus according to claim 18, wherein the first, second, third, and fourth images are analyzed by combination with each other.

26. A method of generating images using millimeter wave energy, the method comprising:

illuminating a scene with millimeter wave radiation produced by at least one first millimeter wave radiation source having a first polarization;

illuminating a scene with millimeter wave radiation produced by at least one second millimeter wave radiation source having a second polarization;

first modulating the first radiation source to produce modulated millimeter wave radiation, wherein the modulation includes alternating the states of the radiation source between a first state and a second state;

second modulating the second radiation source to produce modulated millimeter wave radiation, wherein the modulation includes alternating the states of the radiation source between a third state and a fourth state;

generating a first image with a millimeter wave sensor using the millimeter wave radiation detected from the scene when the first radiation source is in the first state;

generating a second image with the sensor using the millimeter wave radiation detected from the scene when the first radiation source is in the second state;

generating a third image with the sensor using the millimeter wave radiation detected from the scene when the second radiation source is in the third state;

generating a fourth image with the sensor using the millimeter wave radiation detected from the scene when the second radiation source is in the fourth state; and analyzing the generated images to detect representations corresponding to objects within the scene, wherein the analyzing comprises identifying an object in the generated images based on the reflective properties of an object identified in the first and third images and emissive or transmissive properties of the same object in the second and fourth images with respect to millimeter wave radiation.

27. The method of claim 26, further comprising synchronizing said sensor to said first and second modulating.

28. The method of claim 27, wherein synchronizing comprises electro-optically detecting the modulation frequency of the millimeter wave radiation source providing the detected modulation frequency information to an integrator, switch, or image processor associated with said sensor.

29. The method of claim 27, wherein synchronizing comprises detecting a modulation signal provided to said radiation source and providing said modulation signal to a synchronization unit associated with said sensor.

30. The method of claim 26, wherein said objects are concealed from visible-spectrum detection within said scene.

31. The method of claim 30, wherein the modulation frequency of at least one of said radiation sources is the natural power line frequency of an electrical signal providing power to said radiation source.

32. The method of claim 26, wherein analyzing further comprises combining the generated images into at least one composite image such that the at least one composite image has better image quality than any individual generated image.

* * * * *

UNITED STATES PATENT AND TRADEMARK OFFICE
CERTIFICATE OF CORRECTION

PATENT NO. : 7,642,949 B2 Page 1 of 1
APPLICATION NO. : 11/498182
DATED : January 5, 2010
INVENTOR(S) : Pergande et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this

Sixteenth Day of November, 2010

David J. Kappos
*Director of the United States Patent and Trademark Office*